United States Patent [19]
Miller et al.

[11] 3,749,208
[45] July 31, 1973

[54] MOUNTING ASSEMBLY

[75] Inventors: Eric Miller, Robert Eric Miller, both of New South Wales, Australia

[73] Assignee: R. E. Miller Pty. Limited, New South Wales, Australia

[22] Filed: Dec. 6, 1971

[21] Appl. No.: 204,898

[30] Foreign Application Priority Data
May 18, 1971 Australia.............................. 4915/71

[52] U.S. Cl. ............................................... 188/271
[51] Int. Cl. ............................................ F16d 63/00
[58] Field of Search........................ 188/271, 71.1, 83

[56] References Cited
UNITED STATES PATENTS
2,507,182  5/1950  Young, Jr. .......................... 188/83 X
2,571,061  10/1951  Reynolds ........................ 188/71.1 X
1,465,569  8/1923  Arnold.................................. 188/83
3,302,741  2/1967  Brazuk............................ 188/271 X FOREIGN PATENTS OR APPLICATIONS
478,063  1/1938  Great Britain...................... 188/271

Primary Examiner—George E. A. Halvosa
Attorney—David S. Kane, Martin E. Goldstein et al.

[57] ABSTRACT

A mounting assembly for an instrument or a machine to be panned, comprising two piston and housing assemblies, one assembly incorporating viscous drag and the other being for free panning.

8 Claims, 2 Drawing Figures

MOUNTING ASSEMBLY

This invention relates to improvements in the construction of mountings for instruments and machines which have to be panned.

It is well known in the construction of such mountings to provide relative movable members, usually a piston in a housing in which there is a liquid, usually oil, the oil providing a viscous drag which can be varied by using oils of different specification. The viscous drag is designed to give a panning speed to physical effort ratio which does not cause operator fatigue. If rapid panning is required from a mounting designed for slower operation, it may be accomplished by the use of above designed physical effort with resultant operator fatigue and strain on the mounting support. The support may, for example in the case of a tripod, become unstable thereby seriously affecting the smooth travese of the equipment being panned.

It is the object of this invention to provide a mounting assembly for instruments to be panned, the mounting assembly incorporating a unit of known viscous drag type and a lockable pan unit which can be in a substantially drag free manner duplicate the panning movement of the viscous drag unit with which it is associated.

Accordingly the present invention provided a mounting assembly for an instrument or machine to be panned, said mounting assembly comprising a piston assembly having two pistons coaxially joined by a stem, a first housing in which one piston is enclosed in a fluid tight manner, said one piston being rotatable in the housing but not axially movable therein, the working clearance between said one piston and its housing being such that a film of oil can exist therebetween to exercise a viscous drag when said one piston is rotated in its housing recesses in the top and bottom of the other of said pistons, inserts in said recess, a second housing in which said other piston is mounted so as to be rotatable but restrained against axial movement by the engagement of said inserts on adjacent surfaces of the housing, adjustable means on said second housing to regulate the movement of said other piston relative to its housing and attachment means on both housings whereby the housings can be respectively attached to said instrument or machine and a support for said mounting assembly.

The invention is hereinafter described with reference to the drawings in which.

Figure 2:
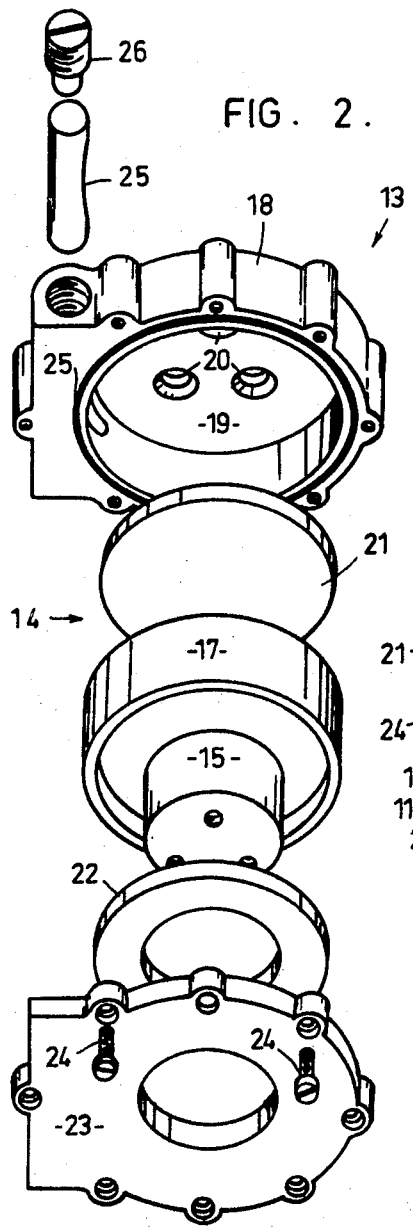
FIG. 2 is a perspective exploded view of the free pan part of the assembly illustrated in FIG. 1.
Figure 1:
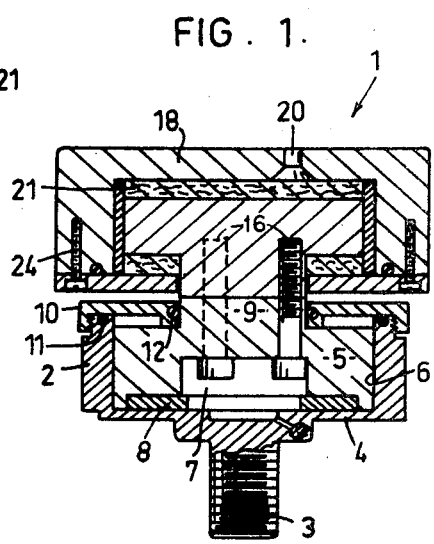
FIG. 1 is a sectional elevation of an assembled mounting assembly.

The mounting assembly 1 comprises a housing 2 having a shank 3 whereby the whole mounting assembly can be secured on a support. The housing 2 is closed at one end 4 and houses a rotatable piston 5 in a bore 6 with clearance between the piston and bore accommodating an oil film providing in known manner a desired viscous drag when the piston is rotated relative to the housing. The piston 5 has a recess forming an oil reservoir and an oil distribution plate 8 lies between the closed end 4 and the piston 5. The piston 5 has a stem 9 which projects through a cover 10 screwed onto the open end of the housing 2. The cover 10 co-acts with a seal 11 in the housing open end and incorporates a seal 12 which engages the stem 9 to retain oil in the cylinder 2.

The free pan unit indicated 13 (see FIG. 2) comprises a piston 14 with a stem 15, which is co-axially fixed to the piston stem 9 by screws 16. The piston 14 comprises a body preferably of aluminium, and a peripheral sleeve 17 preferably of steel although a solid body not sleeved could be used if desired. The piston 14 is rotatably housed with minimum working clearance in a bore in a second housing 18 which is closed at one end as at 19 and has holes 20 therethrough whereby equipment to be panned can be fixed to the mounting assembly. The sleeve 17 is longer than the thickness of the piston body so as to provide at the face of the piston 14 adjacent the closed end 19 of the housing a recess in which a circular pad of fibre 21 is housed so as to stand slightly above the sleeve 17. The upstanding portion of the sleeve and the stem 15 provide in the other face of the piston 14 a recess which is annular in shape. An annular fibre or felt pad 22 is housed in the annular recess so as to stand slightly above the sleeve 17.

A cover plate 23 is secured over the open end of the housing 18 by screw 24 (only two are shown) and a seal 25 is provided in the end of the housing 18. The distance between the end 19 of the housing 18 and the inner face of its cover plate 23 is only slightly greater than the length of the sleeve 17 so as to substantially eliminate rock of thepiston about the axis of rotation whilst allowing working clearance between the parts. To facilitate rotation of the piston 14 and eliminate any possibility of seizure between adjacent faces of the piston and its housing 18 a smear a stable grease (not temperature affected, e.g. silicone base grease) can be used on the various parts.

A brake of known type, indicated 25, and comprising a shoe to engage the periphery of the sleeve is provided to lock the piston 14 against movement relative to its housing or release it for rotation as required. A coarse thread brake control screw 26 is used to affect quick-on-off action of the brake.

We claim:

1. A mounting assembly for an instrument or machine to be panned, said mounting assembly comprising:

a piston;

a cylindrical body having an encircling sleeve longer than the body and extending beyond both ends of the body so as to form a recess with the ends of the body;

a stem co-axially joining the piston to the cylindrical body;

a first housing enclosing the piston in a fluid tight manner, said housing having an opening encircling said stem so that the piston is rotatable in the housing and not axially movable therein, said housing and piston being of such size so that a small working clearance is provided therebetween;

a film of viscous fluid disposed in said working clearance to exercise a viscous drag when said piston is rotated in its housing;

attachment means on said first housing whereby the housing may be attached to the instrument or a support for the mounting assembly;

a second housing encircling said cylindrical body and sleeve and having an opening encircling said stem;

inserts disposed in the recesses formed by the encircling sleeve and the body, said inserts engage adjacent surfaces of the housing to prevent axial movement of the body and cylindrical sleeve;

attachment means on said second housing for attaching the second housing to said instrument or a support for said mounting assembly; and adjustable brake means on said second housing for engagement with the periphery of the sleeve to regulate the movement of said sleeve and cylindrical body relative to the second housing.

2. A mounting assembly for an instrument or machine to the panned, said mounting assembly comprising a piston assembly having two pistons co-axially joined by a stem, a first housing in which one piston is enclosed in a fluid tight manner, said one piston being rotatable in the housing but not axially movable therein, the working clearance between said one piston and its housing being such that a film of oil can exist therebetween to exercise a viscous drag when said one piston is rotated in its housing, a recess in the top and bottom of the other of said pistons, inserts in said recesses, a second housing in which said other piston is mounted so as to be rotatable but restrained against axial movement by the engagement of said inserts on adjacent surfaces of the housing, adjustable means on said second housing to regulate the movement of said other piston relative to its housing and attachment means on both housings whereby the housings can be respectively attached to said instrument or machine and a support for said mounting assembly.

3. A mounting assembly as claimed in claim 2 wherein said inserts are made of fibre.

4. A mounting assembly as claimed in claim 2 wherein said adjustable means is a quick acting brake.

5. A mounting assembly as claimed in claim 1 wherein the piston assembly comprises two pistons each with a stem, the stems being secured one to the other to join the pistons.

6. A mounting assembly as claimed in claim 2 wherein said other piston comprises a body with an encircling sleeve longer than the body and extending beyond both ends of the body so as to form with the ends of the body said recess.

7. A mounting assembly as claimed in claim 2 wherein said housings both comprise a body having a short cylindrical bore which is closed at one end and sealed at the other end by a cover having a central opening encircling said stem.

8. A mounting assembly as claimed in claim 7 wherein at least the cover for said first housing includes a seal associated with the opening in said cover, said seal engaging said stem.

* * * * *